US012698988B2

(12) United States Patent     (10) Patent No.:   US 12,698,988 B2

Fox-Rabinovitz et al.     (45) Date of Patent:     Aug. 4, 2026

(54) PRECISION MULTI-POINT SENSOR POSITION AND ATTITUDE CALIBRATION BRACKETS

(71) Applicant: TORC Robotics, Inc., Blacksburg, VA (US)

(72) Inventors: Joseph Fox-Rabinovitz, Austin, TX (US); Robert Holt, Blacksburg, VA (US); Alexander Little, Blacksburg, VA (US); Matthew Marti, Blacksburg, VA (US); Dietrich Linde, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 551 days.

(21) Appl. No.: 18/138,723

(22) Filed: Apr. 24, 2023

(65) Prior Publication Data

US 2024/0353244 A1     Oct. 24, 2024

(51) Int. Cl.
   *G01D 18/00*      (2006.01)
   *G01C 15/00*      (2006.01)
         (Continued)

(52) U.S. Cl.
   CPC .............. *G01D 18/00* (2013.01); *G01C 15/00* (2013.01); *G01C 15/06* (2013.01); *G01C 25/00* (2013.01);
         (Continued)

(58) Field of Classification Search
   CPC ........ G01D 18/00; G01C 15/06; G01C 25/00; G01C 25/005; G01C 15/00; G01C 1/02; G01S 19/235; G01S 7/497; G01S 19/23
   See application file for complete search history.

(56) References Cited

U.S. PATENT DOCUMENTS

2014/0185059 A1*   7/2014   Steffey .................... G01S 7/481
                                  356/614
2014/0350886 A1*   11/2014   Metzler .................. G01S 7/003
                                  702/150

(Continued)

FOREIGN PATENT DOCUMENTS

DE      102010049662 B4 *   12/2012   ............. G01B 11/26

OTHER PUBLICATIONS

Han et al. (3D Point Cloud Generation Based on Multi-Sensor Fusion. Applied Sciences. 2022; 12(19):9433. https://doi.org/10.3390/app12199433) (Year: 2022).*

(Continued)

*Primary Examiner* — Christian T Bryant

(74) *Attorney, Agent, or Firm* — Armstrong Teasdale LLP

(57)          ABSTRACT

Disclosed herein are systems, methods, and apparatuses for calibrating sensors of automated vehicles using calibration targets. A bracket holds the calibration targets and attaches to the automated vehicle proximate to a sensor being calibrated. For some sensors, such as GNSS antennas or similar device for receiving location data from a GNSS, a two-target bracket is fixed at the top of the automated vehicle, nearby the GNSS antenna. For IMUs or similar sensors, a three-target bracket is fixed at location of the automated vehicle proximate to the particular IMU, such as a passenger cabin or on the chassis of the automated vehicle. The calibration targets include a retroreflective surface that reflect signals, such as infrared signals, back to a theodolite (or total station). The theodolite or computer includes prepro-grammed offset values indicating the relative positions of the sensor being calibrated and each of the calibration targets of the bracket.

14 Claims, 5 Drawing Sheets

(51) Int. Cl.

| | |
|---|---|
| *G01C 15/06* | (2006.01) |
| *G01C 25/00* | (2006.01) |
| *G01S 7/497* | (2006.01) |
| *G01S 19/23* | (2010.01) |

(52) U.S. Cl.
CPC ............ *G01C 25/005* (2013.01); *G01S 7/497* (2013.01); *G01S 19/235* (2013.01)

(56) References Cited

U.S. PATENT DOCUMENTS

| | | | | |
|---|---|---|---|---|
| 2020/0225026 A1* | 7/2020 | Hoegele | ............... | G01B 11/005 |
| 2020/0408520 A1* | 12/2020 | Jensen | ................. | G01C 15/002 |
| 2022/0180559 A1* | 6/2022 | Visan | ........................ | G06T 7/74 |

OTHER PUBLICATIONS

Ilci et al. (High Definition 3D Map Creation Using GNSS/IMU/LIDAR Sensor Integration to Support Autonomous Vehicle Navigation. Sensors (Basel). Feb. 7, 2020;20(3):899. doi: 10.3390/s20030899. PMID: 32046232; PMCID: PMC7039384.) (Year: 2020).*
Leica (Leica TS16 Data Sheet, Leica Geosystems, Nov. 2020) (Year: 2020).*

* cited by examiner

PRECISION MULTI-POINT SENSOR POSITION AND ATTITUDE CALIBRATION BRACKETS

TECHNICAL FIELD

This application generally relates to managing sensors for automated vehicles. In particular, the application relates to systems, methods, and apparatuses for improving access to sensors and measurement-precision during calibration processes.

BACKGROUND

Automated vehicles employ various types of sensors, such as an inertial measurement unit (IMU) or receivers (or antennas) of a Global Navigation Satellite System (GNSS), requiring consistent, accurate, and very precisely referenced sensor measurements. Accordingly, these sensors require high-precision calibration techniques that, among other factors, account for each sensor's particular positioning on or within the automated vehicle. For instance, sensors measuring directional information, such as the IMU, must be oriented correctly in addition to being localized in the vehicle's reference frame.

With any sensor for which a "position" is some internal point that is not visible on a surface, calibrating the position relative to a cab reference frame of the automated vehicle using a theodolite (e.g., Total Station), or other range-based measurement system, always carries a measure of error or difficulties.

Some prior approaches to calibrating a sensor to mitigate the error included mounting reflective stickers on a sensor's casing, though this approach is not always possible, practicable, or effective. Additionally, a correction vector can be in an arbitrary (and unknown) direction relative to the theodolite. This is because the correction vector from the measurement point to the sensor origin can be an arbitrary value in the reference frame of the measurement system.

SUMMARY

As detailed further below, embodiments described herein are systems, methods, and apparatuses for calibrating sensors using specifically designed brackets having two or three reflective surfaces. A current solution for calibrating sensors of automated vehicles involves a single-point bracket. The single-point bracket may help calibrate a cab-mounted IMU. Although the single-point bracket helps mitigate against visibility issues (from a theodolite to the cab-mounted IMU), the single-point bracket does not help calibrate for high-precision positioning. These single-point brackets often result in a worse position estimate during calibration processes compared to what using a simple line-of-sight to a sensor body would have produced, producing an level of error proportional to the length of an bracket lever arm. Moreover, these single-bracket arms may be ineffective or impracticable for calibrating the receiver of the GNSS (sometimes referred to herein as a "GNSS antenna") or similar device for receiving location data from the GNSS. The GNSS antenna typically has a puck or cone shape, which does not lend itself to easy estimation of a base-plane, especially when viewed from below by the theodolite. An operator would aim the theodolite for a point halfway down the cone, as estimated by eye. For similar reasons, the single-bracket arm used for cab-mounted IMUs does not apply effectively or practicably to calibrating the GNSS antenna.

Described herein are systems, methods, and apparatuses for calibrating IMU sensors and GNSS antennas using specifically designed brackets having two or three reflective surfaces visible to a theodolite, or other range-based measurement system, situated on the ground, outside of the cab of the automated vehicle. Calibrating the GNSS antenna uses a two-point bracket comprising two collinear reflective targets with a position reference of the GNSS antenna at the base of the bracket, thereby removing human guesswork aiming the theodolite and reducing much of the previous measurement uncertainty from the calibration process. Calibrating a cab-mounted or chassis-mounted IMU uses a three-point bracket comprising three reflective surfaces forming an "L" shape in which one surface is collinear with the other two surfaces.

In an embodiment, a system comprises a theodolite comprising a controller (or similar processor device) and is configured to generate a plurality of calibration measurements for a sensor of an automated vehicle according to two or more signal reflections returned from two or more corresponding reflective targets fixed to a bracket, the bracket fixed to the automated vehicle proximate to the sensor. The system further comprises a computing device comprising a processor and is configured to: for each reflective target, identify a preconfigured offset value between the particular target and the sensor; for each reflective target, generate a calibration value using the preconfigured offset value and a calibration measurement for the sensor; and generate a calibration setting for the sensor based upon each calibration value generated for each reflective target.

In another embodiment, an apparatus comprises a bracket comprising a first arm and a second arm having three retroreflective targets affixed on the bracket at respective positions relative to a measurement point that is not coplanar with each position of each retroreflective target, wherein a first retroreflective target is affixed to the bracket at a second end of the first arm; a second retroreflective target is affixed to the bracket at a second end of the second arm; and a third retroreflective target is affixed to the bracket at the elbow of the bracket.

In another embodiment, an apparatus comprises a bracket fixed to an automated vehicle proximate to a geolocation sensor antenna of the automated vehicle, wherein the bracket forms a rod having a plurality of retroreflective targets affixed to the bracket at respective collinear positions with respect to a measurement point, including a first retroreflective target proximate to a first end of the bracket rod, and a second retroreflective target proximate to a second end of the bracket.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

DETAILED DESCRIPTION

Figure 1:
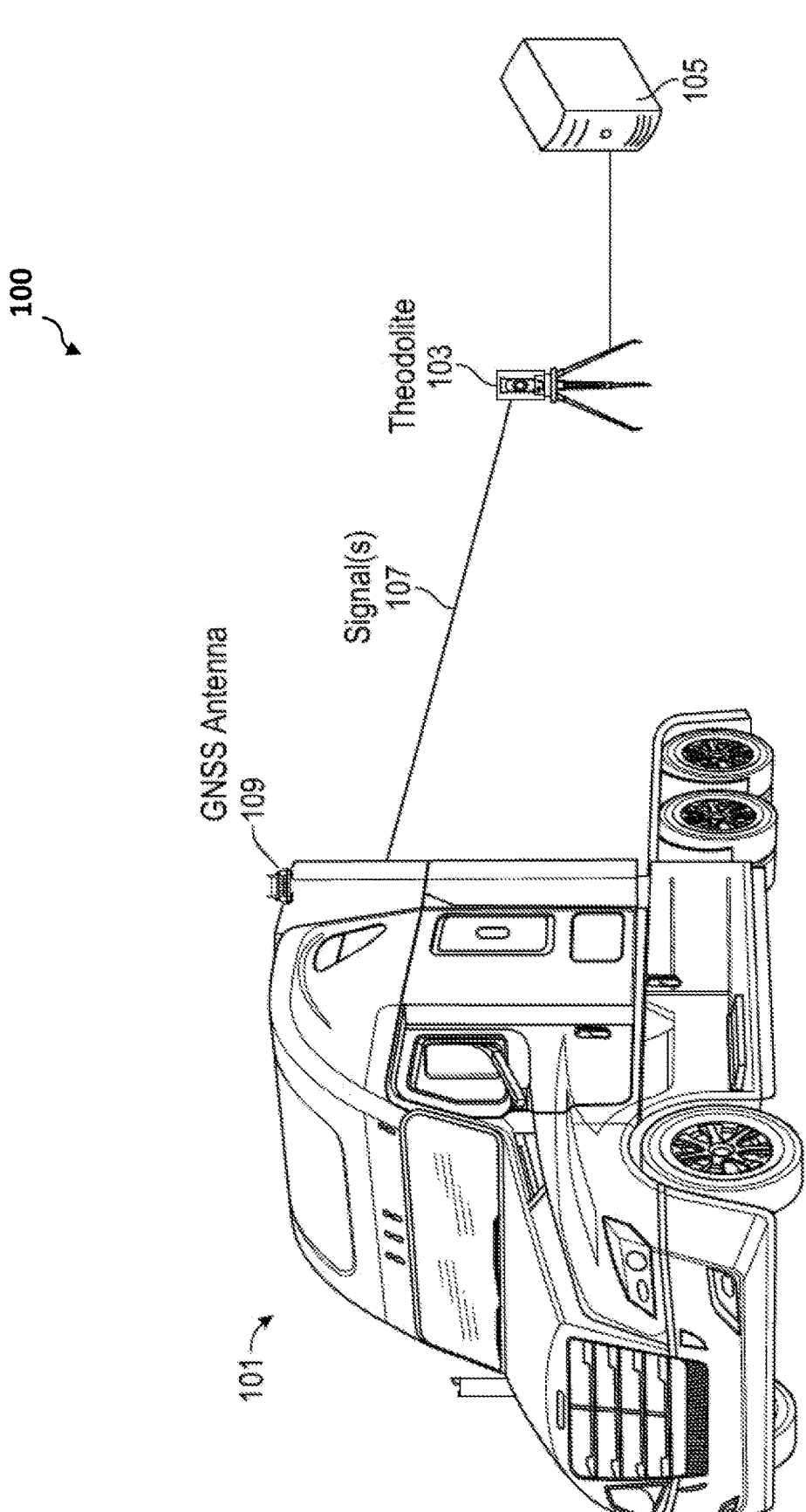
FIG. 1 illustrates components of a system for calibrating sensors of an automated vehicle, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of a system 100 for calibrating sensors of an automated vehicle (shown as a truck 101), according to an embodiment. The system 100 includes a theodolite 103 coupled to a computing device 105. The theodolite 103 generates and captures various calibration measurements for a sensor of the truck 101, such as a GNSS antenna 109 or similar geolocation sensor device or unit for receiving geolocation data from a GNSS. For instance, the theodolite 103 generates the measurements based on retroreflectivity of one or more signals 107 (e.g., infrared carrier signal, optical laser) returned from a retroreflective surface of the sensor. The computing device 105 uses the calibration measurements to calculate calibrating values or corrections for the sensor and generate (or update) calibration settings of the sensor using the calibrating corrections.

The theodolite 103 includes one or more electronic optical instruments, such as a total station, for generating calibration measurements for the sensors of the truck 101 and transmitting the calibration measurements to the computing device 105. For instance, the theodolite may perform an electronic distance measurement (EDM) operation that measures, for example, vertical and horizontal angles and a slope distance from the theodolite 103 to the retroreflective surface of the sensor or other measurement point of the truck 101 (e.g., measurement points associated with retroreflective targets). In some cases, the theodolite collects various types of data that the theodolite transmits to the computing device 105, and the computing device 105 uses the data to generate one or more calibration measurements. Additionally or alternatively, in some cases, a processor or on-board computer of the theodolite 103 collects various types of data and performs certain calculations using the collected data to generate one or more calibration measurements, which the theodolite 103 transmits to the computing device 105. The theodolite 103 communicates with the computing device 105 via one or more networks or other wired or wireless connections, using any number of data communication protocols and techniques for wired or wireless communications.

The computing device 105 includes hardware and software components for generating calibration corrections or calibration settings for the sensors using the various types of data generated and reported by the theodolite 103. The computing device 105 includes one or more electronic devices having hardware and software components capable of performing the various processes and functions described herein. Non-limiting examples of the computing device includes a desktop computer, laptop computer, server computer, tablet, or mobile device, among others. In some cases, the computing device 105 generates and manages a user interface allowing an administrator to operate software for managing the functions of the theodolite 103 and the program functions for calibrating the sensors.

Many times, however, the theodolite 103 is positioned at a location around the truck 100 that lacks line-of-sight with a sensor needing calibration, causing problems with the calibration process. As an example, the GNSS antenna 109 is frequently fixed to the front and top of the truck 101, such that the theodolite 103 lacks line-of-sight with the GNSS antenna 109 and the theodolite 103 cannot send and return the signal 107, to and from the reflective surface of the GNSS antenna 109. As another example, an IMU (not shown) is situated in a cab of the truck 101, such that the theodolite 103 lacks line-of-sight with the IMU and the theodolite 103 cannot send and return the signal 107, to and from the reflective surface of the IMU.

Figure 2:
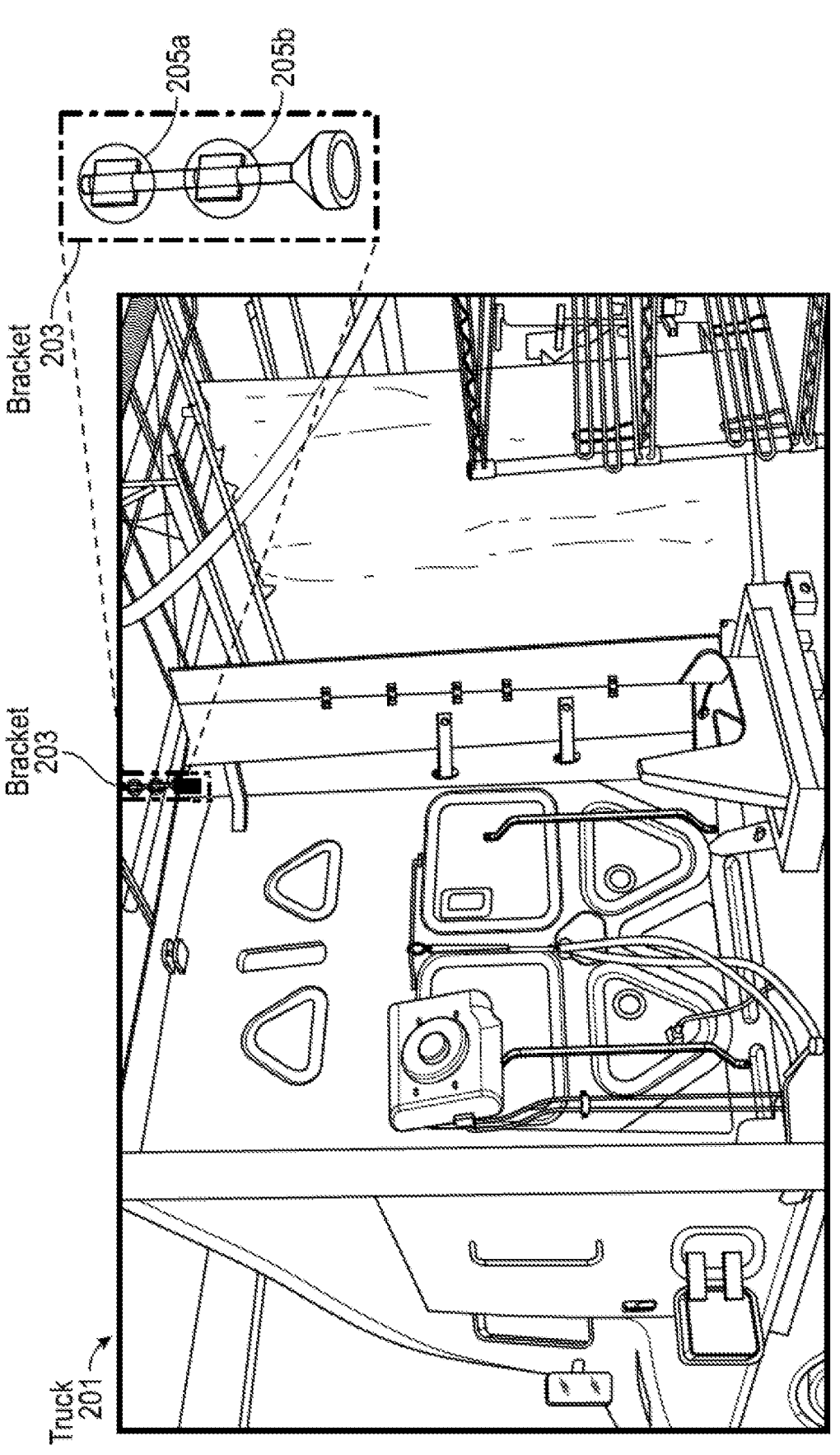
FIG. 2 shows a backside view of an automated vehicle having a two-target bracket for calibrating a GNSS antenna, according to an embodiment.

FIG. 2 shows a backside view of an automated vehicle (shown as a truck 201) having a two-target bracket 203 for calibrating a GNSS antenna (e.g., GNSS antenna 109) or similar component configured to receive location data from a GNSS, according to an embodiment. The truck 201 includes the GNSS antenna fixed to the top of the truck 201 at a location not visible from a theodolite (not shown) situated below and/or behind the truck 201.

The truck 201 further includes the bracket 203 fixed to the truck 201 at a convenient user-friendly location, visible from behind the truck 201 and/or from ground level. For example, the GNSS antenna is fixed on the roof of the truck 201, and the bracket 203 is fixed to the truck 201 proximate (e.g., less than a three feet) to the GNSS antenna, at or below the roofline of the truck 201. The bracket 203 includes two or more linearly arranged calibration targets 205a-205b. Each target 205a-205b includes a retroreflective surface with line-of-sight access to the theodolite capable of reflecting signals to the theodolite. In some embodiments, the bracket 203 is fixed to the truck 201 at or nearby the roofline, such that the calibration targets 205a-205b rise a few inches (e.g., less than 24 inches) above and/or below the roofline. A computing system (e.g., computing device 107) or theodolite are preconfigured with a known offset distance and direction from the actual GNSS antenna to the targets 205a-205b. During a calibration process, the theodolite generates the various calibration measurements, which the calibration process automatically adjusts (or calibrates) based on the known offset and direction between the targets 205a-205b and the GNN antenna.

An administrator enters one or more configuration inputs indicating a high-precision location or position value of the GNSS antenna to, for example, a submillimeter precision-level. The theodolite sends signals to each target 205a-205b, which reflect the signal to the theodolite. The theodolite interprets the reflections to determine the various calibration measurements for the GNSS antenna, including distance and position. The computing device uses the preconfigured offset value and the calibration measurements to generate one or more calibrating values for the sensor. The computing device then generates a calibration setting or correction value for the sensor using the one or more calibration values generated for the sensor from the reflective targets.

The computing device may receive the preconfigured offset from the administrator via a graphical user interface of the computing device. Alternatively, the computing device may receive the preconfigured offset from a client computer coupled to the computing device via a wired or wireless data communication network, where the administrator enters the preconfigured offset via the graphical user interface of the client computer. The preconfigured offset value may be stored into non-transitory machine-readable storage media of the theodolite or the computing device, which the theodolite or the computing device may retrieve when generating the calibrating values. The computing device may store the outputs, such as the calibrating values and calibration settings for the sensors into one or more non-transitory machine-readable storage media of the computing device, theodolite, the sensors, or other computing device.

Figure 3A:
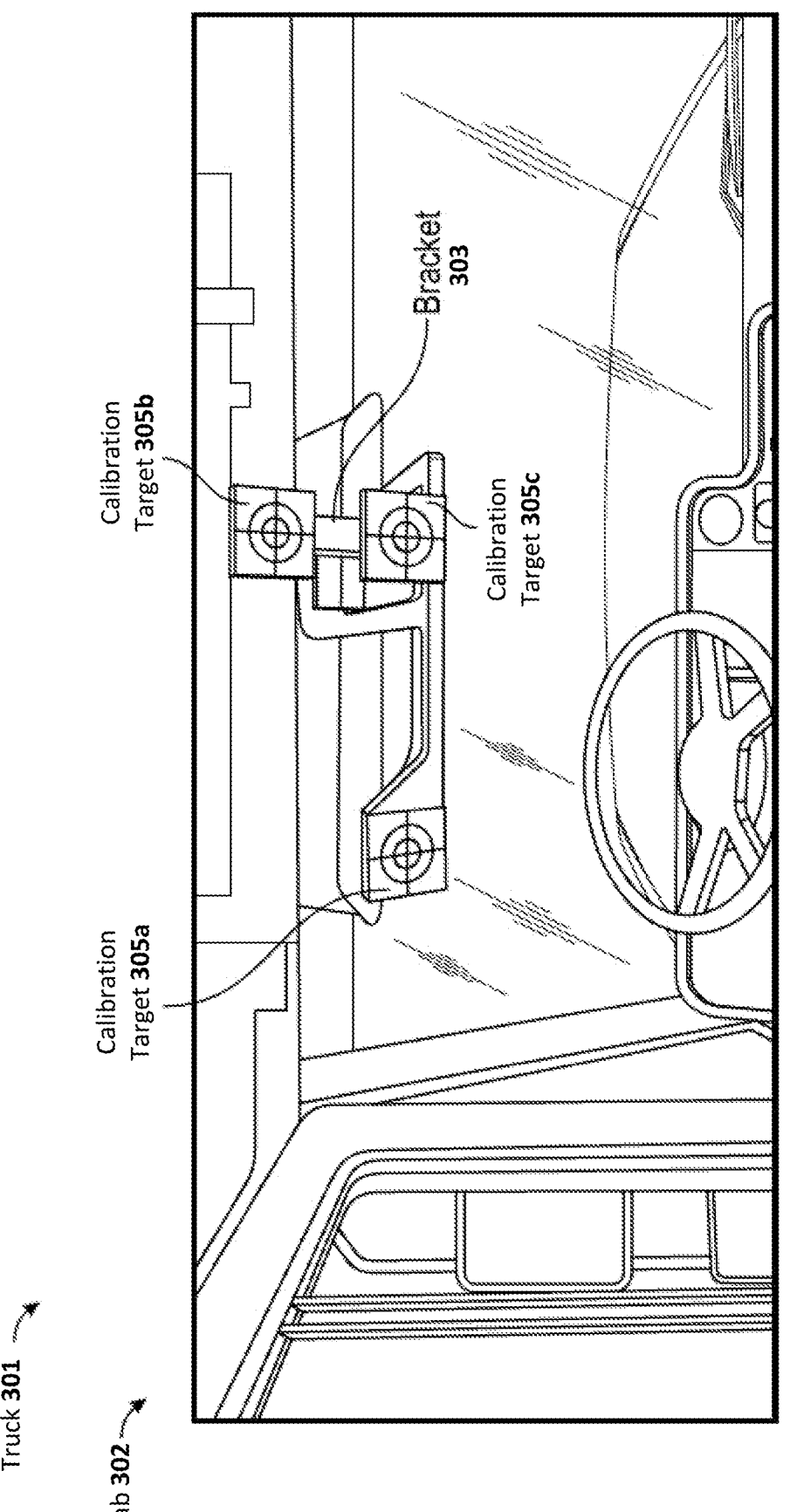
FIGS. 3A-3C show views of an automated vehicle having a three-target bracket fixed at certain points (e.g., cab, chassis) of the automated vehicle for calibrating one or more IMUs, according to an embodiment.
Figure 3B:
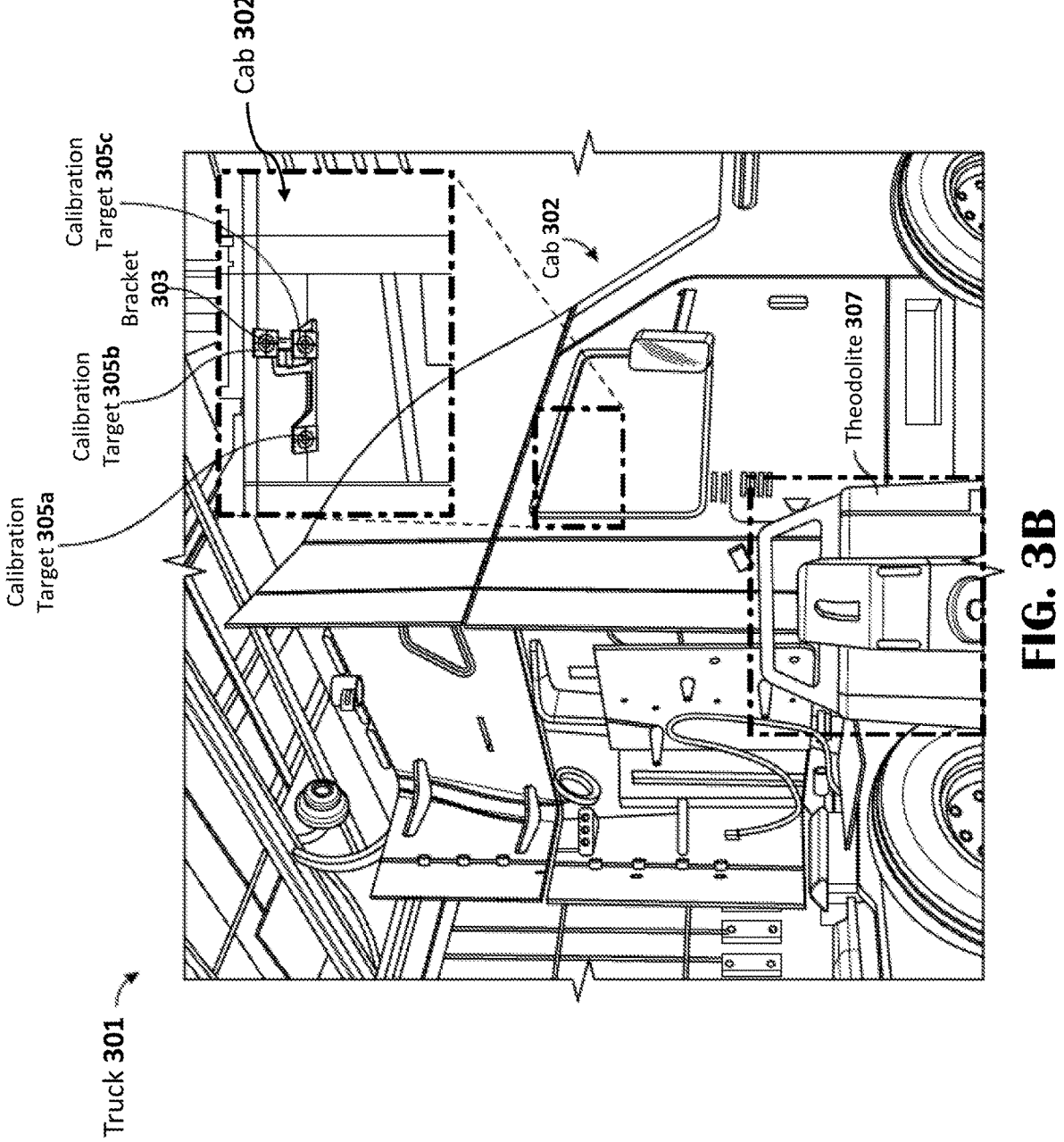
Figure 3C:
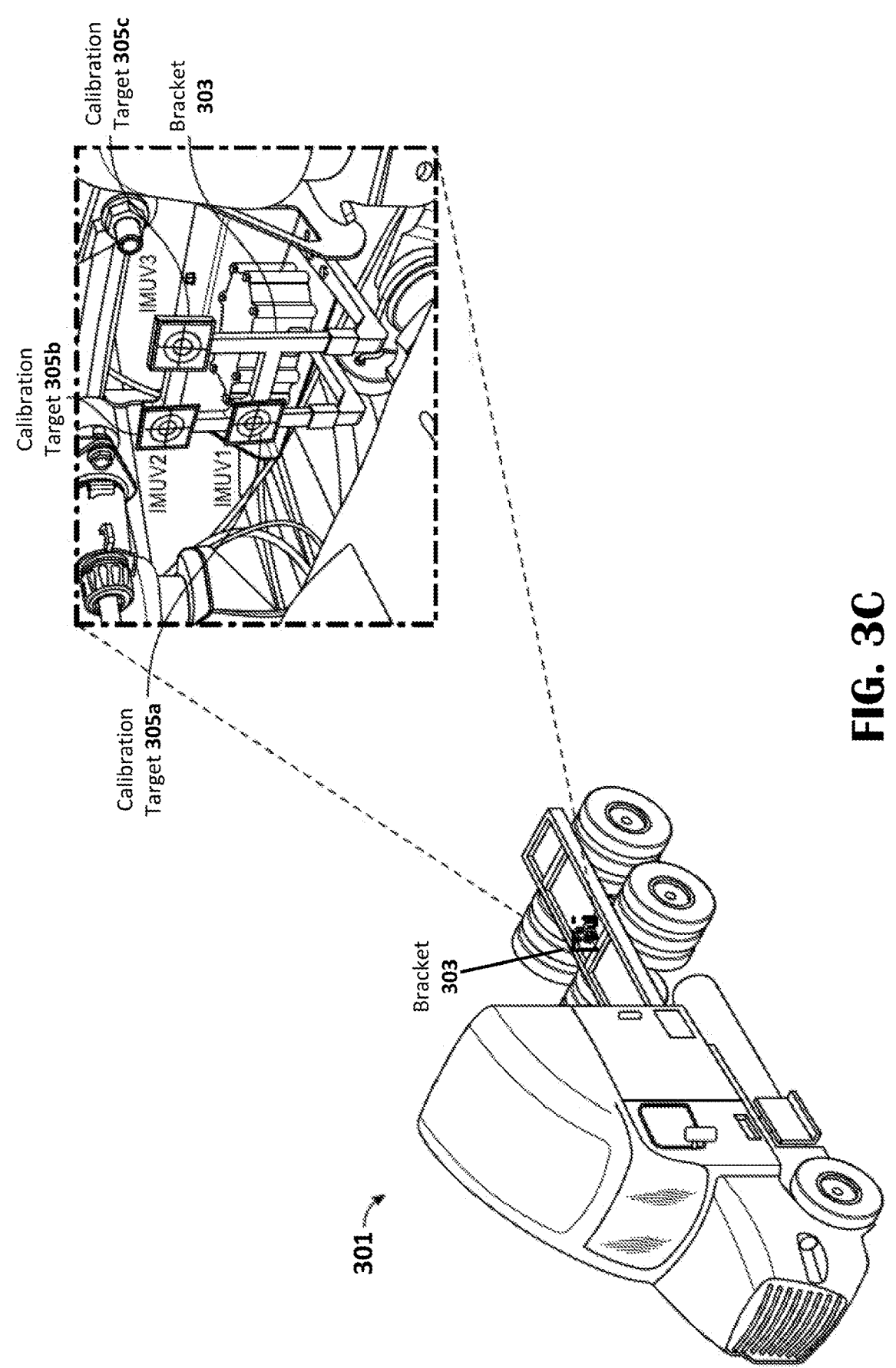

FIGS. 3A-3C show views of an automated vehicle (shown as a truck 301) having a three-target bracket 303 fixed at certain points (e.g., cab 302, chassis) of the truck 301 for calibrating one or more IMUs, according to an embodiment. In particular, FIG. 3A illustrates a view from inside the cab 302 of the truck 301, looking towards the frontend of the truck 301. FIG. 3B illustrates a side view of the truck 301 situated next to the theodolite 307, and includes an enlarged frame showing the cab 302. FIG. 3B shows the truck 301 having an additional or alternative three-target bracket 303 fixed at the chassis of truck 303 for calibrating an IMU, according to an embodiment.

Proper calibration of an IMU requires the theodolite 307 and computing system (e.g., computing device 107) to capture both attitude and position measurements in the final calibration measurements. The bracket 303 includes three coplanar calibration targets 305a-305c, where only a middle target 305c is collinear with the other targets 305a-305b, where a first target 305a and a second target 305b are not collinear to each other. The exact arrangement of the targets 305a-305c and/or measurement points indicated by or associated with the targets 305a-305c of the bracket 303 may vary in potential embodiments. In some embodiments, however, the bracket 303 includes three retroreflective targets affixed on the bracket at respective positions relative to a measurement point that is not coplanar with each position of each retroreflective target. In some embodiments, the three targets 305a-305c and arms of the bracket 303 form a perpendicular L-shape. The theodolite 307 captures information allowing the computing system to calibrate for attitude and position measurements by creating calibration values and calibration settings based on the attitude and position measurements (among other potential calibration measurements).

During the calibration process, the theodolite 307 captures the calibration measurements and the computing system uses a preconfigured, known positions or offsets for the IMU under calibration, such that the computing system stores and references information for the actual location of the IMU and the relative offset information between the targets 305a-305c and the IMU. In some cases, the bracket 303 is attached to a housing of the IMU or otherwise nearby the IMU. An administrator enters one or more configuration inputs indicating a high-precision location or position value of the IMU to, for example, a submillimeter precision-level. The theodolite sends signals to each target 305a-305c, which reflect the signal to the theodolite. The theodolite interprets the reflections to determine various calibration measurements for the IMU, including distance, position, and an attitude estimate for the IMU.

In some embodiments, a system comprises a theodolite and a computing device. The theodolite comprises a controller and is configured to generate a plurality of calibration measurements for a sensor of an automated vehicle according to two or more signal reflections returned from two or more corresponding reflective targets fixed to a bracket. The bracket is fixed to the automated vehicle proximate to the sensor. The computing device comprises a processor and is configured to, for each reflective target, identify a preconfigured offset value between the particular target and the sensor; for each reflective target, generate a calibrating value using the preconfigured offset value and a calibration measurement for the sensor; and generate a calibration setting for the sensor based upon each calibrating value generated for each reflective target.

In some implementations, the sensor includes an inertial measurement unit. The bracket is fixed to the automated vehicle proximate to the inertial measurement unit of the automated vehicle.

In some implementations, the bracket comprises a first arm and a second arm having three retroreflective targets affixed on the bracket at respective positions relative to a measurement point that is not coplanar with each position of each retroreflective target. A first retroreflective target is affixed to the bracket at a second end of the first arm; a second retroreflective target is affixed to the bracket at a second end of the second arm; and a third retroreflective target is affixed to the bracket at a point of the bracket.

In some implementations, the first arm and the second arm form a perpendicular elbow at an intersection of a first end of the first arm and the first end of the second arm.

In some implementations, the sensor includes a geolocation sensor. The bracket is fixed to the automated vehicle proximate to the geolocation sensor of the automated vehicle.

In some implementations, the bracket forms a rod having a plurality of retroreflective targets affixed to the bracket at respective collinear positions with respect to a measurement point. The bracket includes a first retroreflective target proximate to a first end of the bracket rod, and a second retroreflective target proximate to a second end of the bracket.

In some implementations, the computing device is further configured to receive the preconfigured offset via a graphical user interface; and store the preconfigured offset into a non-transitory machine-readable storage medium accessible to the computing device.

In some implementations, when generating the plurality of calibration measurements for the sensor, the theodolite is further configured to perform an electronic distance measurement (EDM) operation that generates the calibration measurement indicating at least one of distance, position, or attitude based upon a location of the theodolite relative to the reflective target.

In some embodiments, a calibration apparatus comprises a bracket comprises a first arm and a second arm having three retroreflective targets affixed on the bracket at respective positions relative to a measurement point that is not coplanar with each position of each retroreflective target. The bracket includes a first retroreflective target is affixed to the bracket at a second end of the first arm; a second retroreflective target is affixed to the bracket at a second end of the second arm; and a third retroreflective target is affixed to the bracket at a point of the bracket.

In some implementations, the first arm and the second arm form a perpendicular elbow at an intersection of a first end of the first arm and the first end of the second arm.

In some implementations, the bracket is affixed to an automated vehicle proximate to a sensor.

In some implementations, the sensor proximate to the calibration apparatus includes an inertial measurement unit.

In some implementations, the bracket is affixed to the automated vehicle proximate to the sensor situated at a passenger cabin of the automated vehicle.

In some implementations, the bracket is affixed to the automated vehicle proximate to the sensor situated at a chassis of the automated vehicle.

In some embodiments, an apparatus comprises a bracket fixed to an automated vehicle proximate to a geolocation sensor antenna of the automated vehicle. The bracket forms a rod having a plurality of retroreflective targets affixed to the bracket at respective collinear positions with respect to a measurement point. The bracket includes a first retrore-flective target proximate to a first end of the bracket rod, and a second retroreflective target proximate to a second end of the bracket.

In some implementations, the bracket is affixed to an automated vehicle proximate to a sensor.

In some implementations, the sensor proximate to the calibration apparatus includes a geolocation sensor device.

In some implementations, the bracket is affixed to the automated vehicle proximate to the sensor situated on a roof of the automated vehicle.

In some implementations, the bracket is affixed to the automated vehicle proximate to the sensor and at a roofline of the automated vehicle.

In some implementations, the bracket is affixed to the automated vehicle proximate to the sensor and the plurality of retroreflective targets rise above a roofline of the auto-mated vehicle.

The various illustrative logical blocks, modules, circuits, and algorithm steps described in connection with the embodiments disclosed herein may be implemented as elec-tronic hardware, computer software, or combinations of both. To clearly illustrate this interchangeability of hardware and software, various illustrative components, blocks, mod-ules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or pro-cessor-readable storage medium. A non-transitory computer-readable or processor-readable media includes both com-puter storage media and tangible storage media that facilitate transfer of a computer program from one place to another. A non-transitory processor-readable storage media may be any available media that may be accessed by a computer. By way of example, and not limitation, such non-transitory proces-sor-readable media may comprise RAM, ROM, EEPROM, CD-ROM or other optical disk storage, magnetic disk stor-age or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer pro-gram product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been dis-closed, other aspects and embodiments are contemplated. The various aspects and embodiments disclosed are for purposes of illustration and are not intended to be limiting, with the true scope and spirit being indicated by the follow-ing claims.

What is claimed is:

1. A system comprising:

a bracket comprising two or more reflective targets, the bracket configured to be attached to an autonomous vehicle;

a theodolite positioned with line-of-sight access to the two or more reflective targets and lacking line-of-sight access to a sensor of the autonomous vehicle, the theodolite comprising a controller and configured to generate a plurality of calibration measurements for the sensor of the autonomous vehicle according to two or more signal reflections returned from the two or more reflective targets; and a computing device comprising a processor and config-ured to:

for each reflective target, identify a preconfigured offset value between the particular target and the sensor;

for each reflective target, generate a calibrating value using the preconfigured offset value and a calibration measurement for the sensor;

generate a calibration setting for the sensor based upon each calibrating value generated for each reflective target; and calibrate the sensor, based on the calibration setting.

2. The system according to claim 1, wherein the sensor includes an inertial measurement unit, and wherein the bracket is configured to be fixed to the autonomous vehicle proximate to the inertial measurement unit of the autonomous vehicle.

3. The system according to claim 2, wherein the bracket comprises a first arm and a second arm and comprises three retroreflective targets affixed on at least one of the first arm or the second arm at respective positions relative to a measurement point that is not coplanar with each position of each retroreflective target, and wherein a first retroreflective target is affixed to the bracket at a second end of the first arm;

a second retroreflective target is affixed to the bracket at a second end of the second arm; and a third retroreflective target is affixed to the bracket at a point of the bracket.

4. The system according to claim 3, wherein the first arm and the second arm form a perpendicular elbow at an intersection of a first end of the first arm and a first end of the second arm.

5. The system according to claim 1, wherein the sensor includes a geolocation sensor, and wherein the bracket is configured to be fixed to the autonomous vehicle proximate to the geolocation sensor of the autonomous vehicle.

6. The system according to claim 1, wherein the bracket forms a rod and comprises a plurality of retroreflective targets affixed to the rod at respective collinear positions with respect to a measurement point, the plurality of retroreflective targets comprising:

a first retroreflective target proximate to a first end of the rod, and a second retroreflective target proximate to a second end of the rod.

7. The system according to claim 1, wherein the computing device is further configured to:

receive the preconfigured offset via a graphical user interface; and store the preconfigured offset into a non-transitory machine-readable storage medium accessible to the computing device.

8. The system according to claim 1, wherein when generating the plurality of calibration measurements for the sensor, the theodolite is further configured to:

perform an electronic distance measurement (EDM) operation that generates the calibration measurement indicating at least one of distance, position, or attitude based upon a location of the theodolite relative to the reflective target.

9. A system comprising:

an autonomous vehicle comprising a sensor;

a bracket comprising two or more reflective targets, the bracket configured to be attached to the autonomous vehicle;

a theodolite positioned with line-of-sight access to the two or more reflective targets and lacking line-of-sight access to a sensor of the autonomous vehicle, the theodolite comprising a controller and configured to generate a plurality of calibration measurements for the sensor of the autonomous vehicle according to two or more signal reflections returned from the two or more reflective targets; and a computing device comprising at least one processor in communication with at least one memory, the at least one processor programmed to:

for each reflective target, identify a preconfigured offset value between the particular target and the sensor;

for each reflective target, generate a calibrating value using the preconfigured offset value and a calibration measurement of the sensor;

generate a calibration setting of the sensor, based on each calibrating value generated for each reflective target; and calibrate the sensor, based on the calibration setting.

10. The system according to claim 9, wherein the sensor comprises an inertial measurement unit.

11. The system according to claim 9, wherein the bracket comprises a first arm and a second arm and comprises three retroreflective targets affixed on at least one of the first arm or the second arm at respective positions relative to a measurement point that is not coplanar with each position of each retroreflective target, and wherein a first retroreflective target is affixed to the bracket at a second end of the first arm;

a second retroreflective target is affixed to the bracket at a second end of the second arm; and a third retroreflective target is affixed to the bracket at a point of the bracket.

12. The system according to claim 11, wherein the first arm and the second arm form a perpendicular elbow at an intersection of a first end of the first arm and a first end of the second arm.

13. The system according to claim 9, wherein the bracket forms a rod and comprises a plurality of retroreflective targets affixed to the rod at respective collinear positions with respect to a measurement point, the plurality of retroreflective targets comprising:

a first retroreflective target proximate to a first end of the rod, and a second retroreflective target proximate to a second end of the rod.

14. The system according to claim 9, wherein when generating the plurality of calibration measurements for the sensor, the theodolite is further configured to:

perform an electronic distance measurement (EDM) operation that generates the calibration measurement indicating at least one of distance, position, or attitude based on a location of the theodolite relative to the reflective target.

* * * * *